US011969994B2

(12) United States Patent
Lien et al.

(10) Patent No.: US 11,969,994 B2
(45) Date of Patent: Apr. 30, 2024

(54) INK JET NOZZLE HEALTH AND PRINTING RELIABILITY

(71) Applicant: ASSA ABLOY AB, Stockholm (SE)

(72) Inventors: Brent D. Lien, Minneapolis, MN (US); Evan Pastor, Edina, MN (US); Chad Everett Beery, Waconia, MN (US); Bradley O'Hara, Chanhassen, MN (US); Kyrsten Dominique Elemino, Hopkins, MN (US); Tanya Jegeris Snyder, Edina, MN (US)

(73) Assignee: ASSA ABLOY AB, Stockholm (SE)

( * ) Notice: Subject to any disclaimer, the term of this patent is extended or adjusted under 35 U.S.C. 154(b) by 33 days.

(21) Appl. No.: 17/090,238

(22) Filed: Nov. 5, 2020

(65) Prior Publication Data

US 2022/0080722 A1 Mar. 17, 2022

Related U.S. Application Data

(60) Provisional application No. 63/078,285, filed on Sep. 14, 2020.

(51) Int. Cl.
*B41J 2/045* (2006.01)
*B41J 2/165* (2006.01)
*B41J 2/175* (2006.01)

(52) U.S. Cl.
CPC ......... *B41J 2/0451* (2013.01); *B41J 2/04586* (2013.01); *B41J 2/16535* (2013.01); *B41J 2/17513* (2013.01); *B41J 2/17566* (2013.01)

(58) Field of Classification Search
None
See application file for complete search history.

(56) References Cited

U.S. PATENT DOCUMENTS 6,231,174 B1 5/2001 Haigo
6,257,696 B1 7/2001 Nakamura
(Continued)

FOREIGN PATENT DOCUMENTS

CN 102381027 3/2012
CN 209351083 9/2019
(Continued)

OTHER PUBLICATIONS

"European Application Serial No. 21181753.1, Partial European Search Report mailed Jan. 12, 2022", 16 pgs.
(Continued)

*Primary Examiner* — Alejandro Valencia
(74) *Attorney, Agent, or Firm* — Schwegman Lundberg & Woessner, P.A.

(57) ABSTRACT

Systems and techniques for preserving and improving ink jet nozzle health and printing reliability are disclosed herein. The method may include monitoring whether a triggering event has occurred. In response to detecting the triggering event has occurred, pumping at least a portion of ink contained in a header tank in a direction toward an ink cartridge through a tube connecting the header tank to the ink cartridge. The header tank connected to a print head included as a part of a scan head. The method may further include circulating the ink through the tube back into the header tank, and agitating the scan head by moving the scan head along an x-y gantry. Additional methods may include reverse purging, ejecting a portion of ink through nozzles on the print head while simultaneously wiping a nozzle plate included on the print head, and randomizing print head location when printing.

19 Claims, 10 Drawing Sheets

(56) References Cited

U.S. PATENT DOCUMENTS

| | | | | |
|---|---|---|---|---|
| 6,609,780 | B2 | 8/2003 | Sugiyama | |
| 7,717,540 | B1 | 5/2010 | King et al. | |
| 8,657,395 | B2 | 2/2014 | Masunaga et al. | |
| 9,539,815 | B2 | 1/2017 | Martin et al. | |
| 9,757,941 | B2 | 9/2017 | Gracia Verdugo et al. | |
| 2009/0262150 | A1* | 10/2009 | Morita | B41J 2/175 347/17 |
| 2010/0231622 | A1* | 9/2010 | Sasaki | B41J 2/17509 347/85 |
| 2011/0128329 | A1* | 6/2011 | Yoshino | B41J 29/38 347/85 |
| 2012/0050355 | A1* | 3/2012 | Murahashi | B41J 2/175 347/1 |
| 2012/0320126 | A1 | 12/2012 | Martin et al. | |
| 2013/0057604 | A1* | 3/2013 | Masunaga | B41J 2/175 347/6 |
| 2016/0039212 | A1* | 2/2016 | Elferink | B41J 2/2103 347/20 |
| 2017/0210126 | A1* | 7/2017 | Kato | B41J 2/18 |
| 2019/0070861 | A1 | 3/2019 | Regensburger et al. | |
| 2019/0224982 | A1* | 7/2019 | Miyazaki | B41J 2/18 |
| 2020/0247154 | A1* | 8/2020 | Sekikawa | B41J 19/005 |
| 2020/0262204 | A1 | 8/2020 | Harabe | |

FOREIGN PATENT DOCUMENTS

| | | |
|---|---|---|
| CN | 111497470 | 8/2020 |
| CN | 114179508 A | 3/2022 |
| EP | 3967501 | 10/2023 |

OTHER PUBLICATIONS

"European Application Serial No. 21181753.1, Extended European Search Report mailed Apr. 13, 2022", 13 pgs.
"European Application Serial No. 21181753.1, Response Filed Nov. 28, 2022 to Extended European Search Report mailed Apr. 13, 2022", 12 pgs.
"Chinese Application Serial No. 202110700194.6, Office Action mailed Nov. 3, 2022", w English Translation, 13 pgs.
"Chinese Application Serial No. 202110700194.6, Response Filed Feb. 24, 2023 to Office Action mailed Nov. 3, 2022", with English claims, 19 pages.
"Chinese Application Serial No. 202110700194.6, Response Filed Mar. 27, 2023 to Telephone Call with Examiner filed Mar. 23, 2023.", with English claims, 12 pages.
"European Application Serial No. 23151674.1, Extended European Search Report mailed Apr. 26, 2023", 10 pgs.
"European Application Serial No. 23151675.8, Extended European Search Report mailed Apr. 26, 2023", 8 pgs.
"European Application Serial No. 21181753.1, Response Filed Jun. 13, 2023 to Communication under Rule 71 (3) mailed May 19, 2023", No amendments to claims, 2 pgs.
"European Application Serial No. 23151675.8, Response filed Nov. 29, 2023 to Extended European Search Report mailed Apr. 26, 2023", 13 pgs.
"European Application Serial No. 23151674.1, Response filed Nov. 30, 2023 to Extended European Search Report mailed Apr. 26, 2023", 11 pgs.

* cited by examiner

INK JET NOZZLE HEALTH AND PRINTING RELIABILITY

PRIORITY APPLICATION

This application claims priority to U. S. Provisional Application Ser. No. 63/078,285, filed Sep. 14, 2020, the disclosure of which is incorporated herein in its entirety by reference.

TECHNICAL FIELD

The present disclosure relates to nozzle health for ink jet printers.

BACKGROUND

Ink jet printers, such as piezoelectric ink jet printers, have a number of uses, such as, for example, using ink to print on paper as well as substrate surfaces, such as plastic, used for identification cards (e.g., government-issued licenses, workplace identification cards, or the like). During routine operation of an ink jet printer it is common for performance of the ink jet nozzles to be reduced over time (e.g., by becoming clogged) which, in turn, reduces print quality.

SUMMARY

Described herein are systems and methods for improving ink jet nozzle health and printing reliability of an ink jet printer. A system may generally include a processor and memory, including instructions stored thereon which, when executed by the processor, cause the processor to monitor whether a triggering event has occurred. In an example, the triggering event may be an elapsed period of time. The elapsed period of time may be an amount of time the printer has been powered off, an amount of time the printer has remained idle, an amount of time the printer has been in a low-power mode, or an amount of time since an ink cartridge has been manually agitated, shaken, or the like. The period of time may be determined by the processor (e.g., 8 hours of idle time), or manually selected by a user.

When the processor detects that the triggering event has occurred, the processor may cause at least a portion of ink contained in a header tank, the header tank included as a part, component, or the like, of a scan head, to be pumped, moved, or the like, in a direction from the header tank toward the ink cartridge, for example, through one or more tubes connecting the ink cartridges to the header tank. The system may circulate the ink from the direction toward the ink cartridge back into the header tank. The header tank may include a level sensor that the system may use to monitor a level of ink in the header tank (e.g., to prevent the header tank from overfilling as ink is circulated back into it). The system may further agitate the scan head by causing the scan head to move in at least one of: a left-to-right direction, a right-to-left direction, a back-to-front direction, or front-to-back direction, along an x-y gantry.

The system may also, optionally, apply a "tickle pulse" to the print head to further mix the ink to be ejected from the print head. This may include the processor causing a waveform (e.g., a current, voltage, or pulsed voltage in which the pulses are a controlled voltage stepped upward or downward) to be applied to the print head that is not strong enough to eject a drop of ink from a nozzle in the print head, but will mix the ink within the print head.

A method for improving ink jet nozzle health and printing reliability of the ink jet printer may include, moving a scan head to a maintenance station. The maintenance station may include a purge cap and a wiper (e.g., a printhead ink purging reservoir and a separate printhead nozzle plate wiper), and the scan head may include at least a header tank, and a print head operatively connected to the header tank. The print head may include a nozzle plate, the nozzle plate including at least one row of nozzles containing a plurality of nozzles. The method may further include creating at least a partial seal between the purge cap and at least one of: a particular nozzle of the plurality of nozzles, the row of nozzles, the nozzle plate, or the print head. The method may also include performing a reverse purge of at least one of: a particular nozzle of the plurality of nozzles, the row of nozzles, the nozzle plate, or the print head. The reverse purging may include applying a positive pressure using the purge cap by reversing a direction of a vacuum pump (e.g., a peristaltic pump). The reverse purging may cause at least a portion of ink located in at least one nozzle of the plurality of nozzles to be pushed, moved, or the like, through at least one nozzle in a direction toward the header tank. The direction of the vacuum pump may optionally be reversed again (e.g., to turn, operate, move, rotate, or the like, in a forward direction) causing the vacuum pump, using the purge cap, to apply a negative pressure to suck ink, clogs, obstructions, or the like, through at least one nozzle of the plurality of nozzles.

A method may further include ejecting an amount of ink from the print head and activating the wiper to move across the nozzle plate simultaneously or substantially simultaneously with the ejecting of the amount of ink. The amount of ink may be cleaned from the wiper by rotating the wiper about an axle, causing the amount of ink to enter a waste deposit located below the wiper and the axle. The amount of ink (e.g., waste ink) may then be removed from the waste deposit using the vacuum pump, or a second vacuum pump.

A method may also include printing a first image onto a first substrate using the print head. The print head may begin printing the first image from a first starting position above the first substrate. During the printing of the first image, particular ones of the plurality of nozzles included on the print head may be used, while other particular ones of the plurality of nozzles may not be used. The method may further include randomizing a second starting position relative to the first starting position.

In an example, the method may then include printing a second image onto a second substrate using the print head, wherein the print head begins the printing of the second image from the second starting position. In an example, at least a portion of the first image may be identical to at least a portion of the second image. Similarly, the first substrate may be substantially the same size as the second substrate. When printing the second image, at least one nozzle of the particular ones of the plurality of nozzles used in printing the first image may not be used. Further, when printing the second image, at least one of the other particular ones of the plurality of nozzles not used when printing the first image may be used. In short, different nozzles on the print head may be used, utilized, or the like, when printing the first image than are used/utilized when printing the second image, to prevent nozzles from remaining dormant or unused for an extended period of time.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Ink jet printing with pigmented ink, especially with white ink, can be challenging because the pigment in the ink may have relatively large particles. Such inks include, for example, inks containing titanium-dioxide pigment. Large particles can settle out of solution and lead to clogged nozzles (e.g., printhead nozzles, such as piezoelectric printhead nozzles) or reduce the opacity of the ink. Further, when printing certain images, some of the ink jet nozzles may not be utilized during the printing, depending on, for example, the size, shape, and/or location of the image to be printed on a substrate. When nozzles are left idle for an extended period of time, they may not stay primed, leading to poor jetting characteristics due to pigment settling. Additionally, when the same print job (e.g., printing essentially the same image or series of images on a plurality of similar substrates, such as plastic identification cards, each printing to a substrate referred to herein as a “print operation” within the print job) is sent to the printer many times, it can often result in only certain nozzles being used, which can then lead to poor print quality when a new or different print job or new or different image is printed. The disclosed systems and methods provide efficient, low-cost solutions to such issues without the need of costly equipment.

Figure 1:
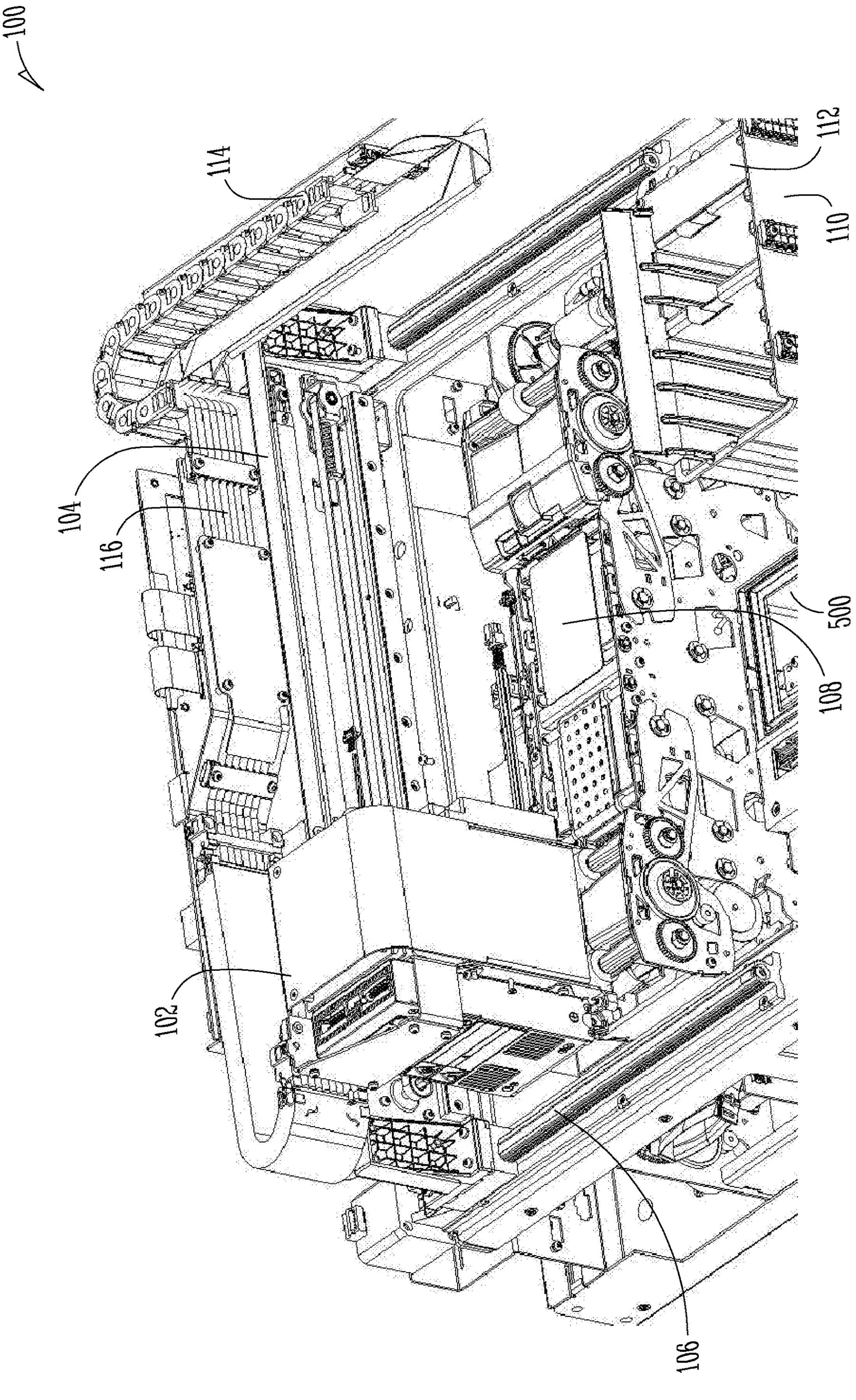
FIG. 1 illustrates an example of the interior of a printer employing the systems and methods described herein.

Particularly, described herein are systems and methods for improving ink jet nozzle health and printing reliability. FIG. 1 illustrates an example of the interior 100 of a printer employing systems and methods described herein. Generally, the interior 100 of the printer may include a print carriage configured to hold one or more ink cartridges. This may include cartridges containing pigmented ink such as black, white, cyan, yellow, magenta, or the like, or unpigmented varnish (e.g., a clear coat). Ink may be fed/sent/moved, or the like, from the ink cartridges via one or more tubes, or one or more series of tubes, located in the interior 100 of the printer, to one or more header tanks. The header tanks may be a component, part, or the like, of a scan assembly/scan head which may also include print heads from which ink is ejected, dropped, deposited, or the like. The scan assembly may be movable in multiple directions (e.g., horizontally/left-to-right/right-to-left, and back and forth) along a gantry, rails, or the like, to allow for printing over an entire surface of a substrate. The scan assembly may also be movable over a maintenance station, configured to clean the print heads, or nozzles on the print head nozzle plate (e.g., clearing clogs, removing excess ink, or the like).

In a specific example illustrated in FIG. 1, the interior 100 of the printer may include a scan head 102 that moves along an x-y gantry. The gantry may include a x-direction gantry/scan rail 104 and at least one y-direction gantry/scan rail 106. The x-direction gantry 104 may allow the scan head 102 to move in a substantially sideways/horizontal direction (e.g., left-to-right or right-to-left), or more generally, along a first axis (e.g., an x-axis). The y-direction gantry 106 may allow the scan head 102 to move substantially perpendicular to the x-direction gantry 104 (e.g., forward and backward, front-to-back, back-to-front, or the like), or more generally, along a second axis (e.g., a y-axis). This may allow the scan head 102 to print with complete coverage over a card surface 108 without having to reposition the card surface 108.

In an example, the interior 100 may further include a print cartridge carriage 110 configured to hold, contain, or the like, one or more print/ink cartridges 112 containing ink. Each ink cartridge, such as ink cartridge 112, may be connected to a header tank (as shown and described in FIG. 2 below) included within the scan head 102, via a tube 116 (e.g., a hose, tubing, or any similar flexible material capable of containing and moving ink), that may be efficiently located (e.g., run along, fed, or the like) along, near, through, proximate to (e.g., behind), or the like, a flexible or semi-flexible chain 114 or other type of linking mechanism located along a side and rear of the interior 100 and capable of moving with or otherwise accommodating movement of the scan head 102. The tube 116 may connect to the ink cartridge 112 in an area below the ink cartridge 112 or the print cartridge carriage 110 and connect to a pump, such as a peristaltic pump shown and described in FIG. 6 below, or other similar pump to move the ink through the tube 116. The tube 116 may be connected to the scan head 102 by locating the tube 116 along the chain 114 which runs to the scan head 102. It is understood that there may be more than one tube or series of tubes, such as tube 116, as needed, and that the tubes may be located in the interior 100 along any suitable path, route, or the like, from the ink cartridges, such as ink cartridge 112, or the print cartridge carriage 110 to the header tanks. For example, the system may contain one tube per ink cartridge feeding to one header tank (as described below) or there may be multiple tubes per ink cartridge feeding ink to multiple header tanks, or multiple chambers of a single header tank.

The interior 100 may also include a maintenance station 500, as described below in FIG. 5, configured to clean, clear, or otherwise maintain the print heads located on the bottom of the scan head 102. The maintenance station 500, may include a purge cap 502 and a wiper 504 as discussed below, configured to clean the print heads (discussed below in FIG. 3).

Figure 2:
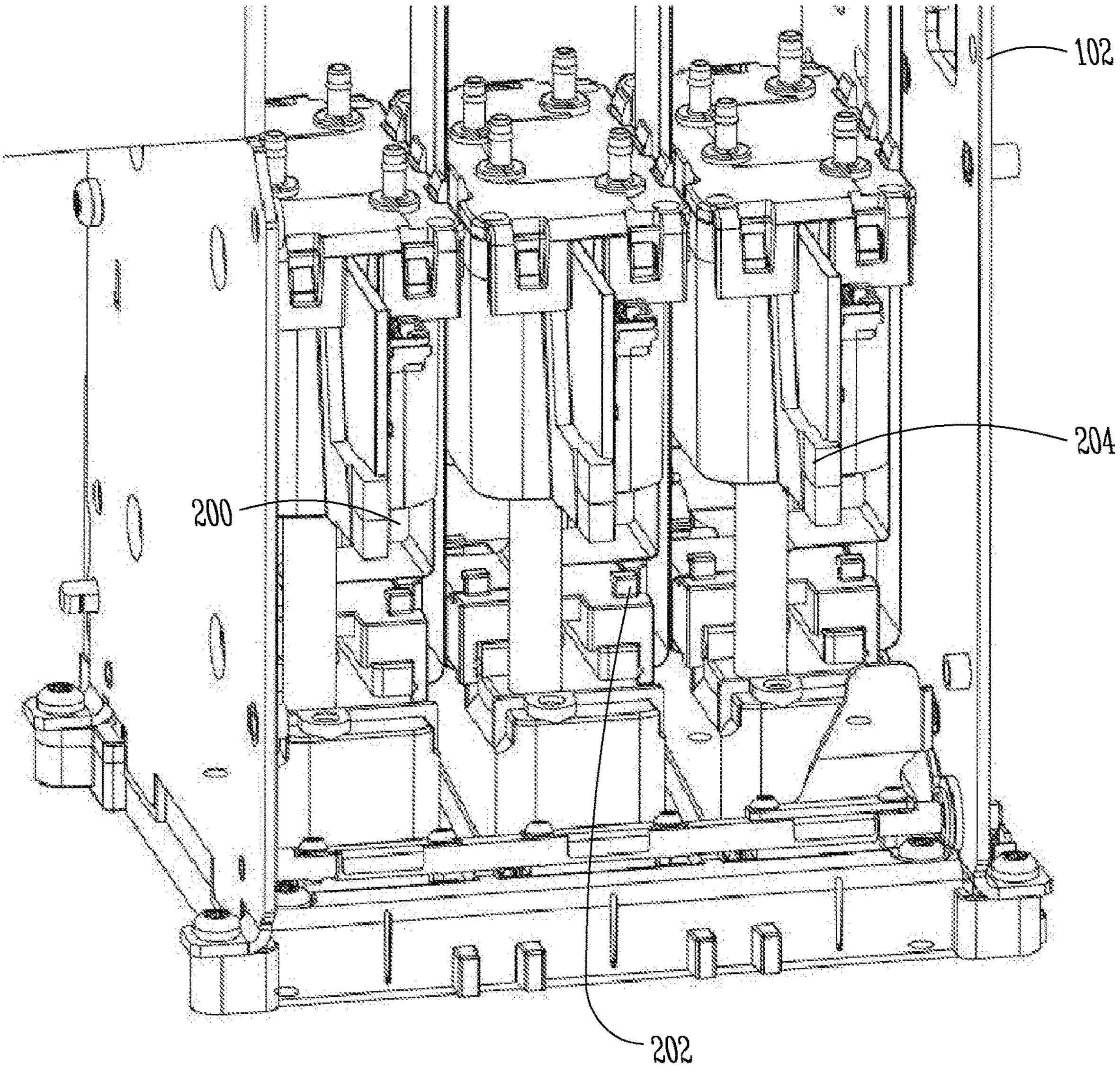
FIG. 2 illustrates an example of header tanks connected to print heads.

FIG. 2 illustrates an example of header tanks connected to print heads. The scan head may contain one or more header tanks which are fed ink from the ink cartridges through the tubing, such as tube 116, as described above for FIG. 1. The header tanks may, in turn, contain one or more chambers into which the ink or varnish from the ink cartridges is contained. For example, a header tank may have a single chamber containing a pigmented ink, or, alternatively, two or more chambers (e.g., dual chambers). In such an example, one of the chambers may contain a pigmented ink while the other chamber contains a different colored pigmented ink. Or, alternatively, one or more chambers may contain a varnish/ clear coat.

In an example illustrated in FIG. 2, the scan head 102 may include header tanks 200, 202, 204 which contain ink directed from corresponding ink cartridges, such as ink cartridge 112, via tubing, such as tube 116, located along the chain 114, as described above for FIG. 1. In an example, at least a portion of the chain 114 may be located behind the scan head 100 and allows tubing, such as tube 116 from the ink cartridges, such as ink cartridge 112, to connect to a corresponding one of the header tanks, such as header tanks 200, 202, 204, located in scan head 102. In an example, the header tanks 200, 202, 204 may be dual chamber tanks, which feed ink to print heads, and nozzles located on the print heads (as described below), which are located below the header tanks 200, 202, 204.

Figure 3:
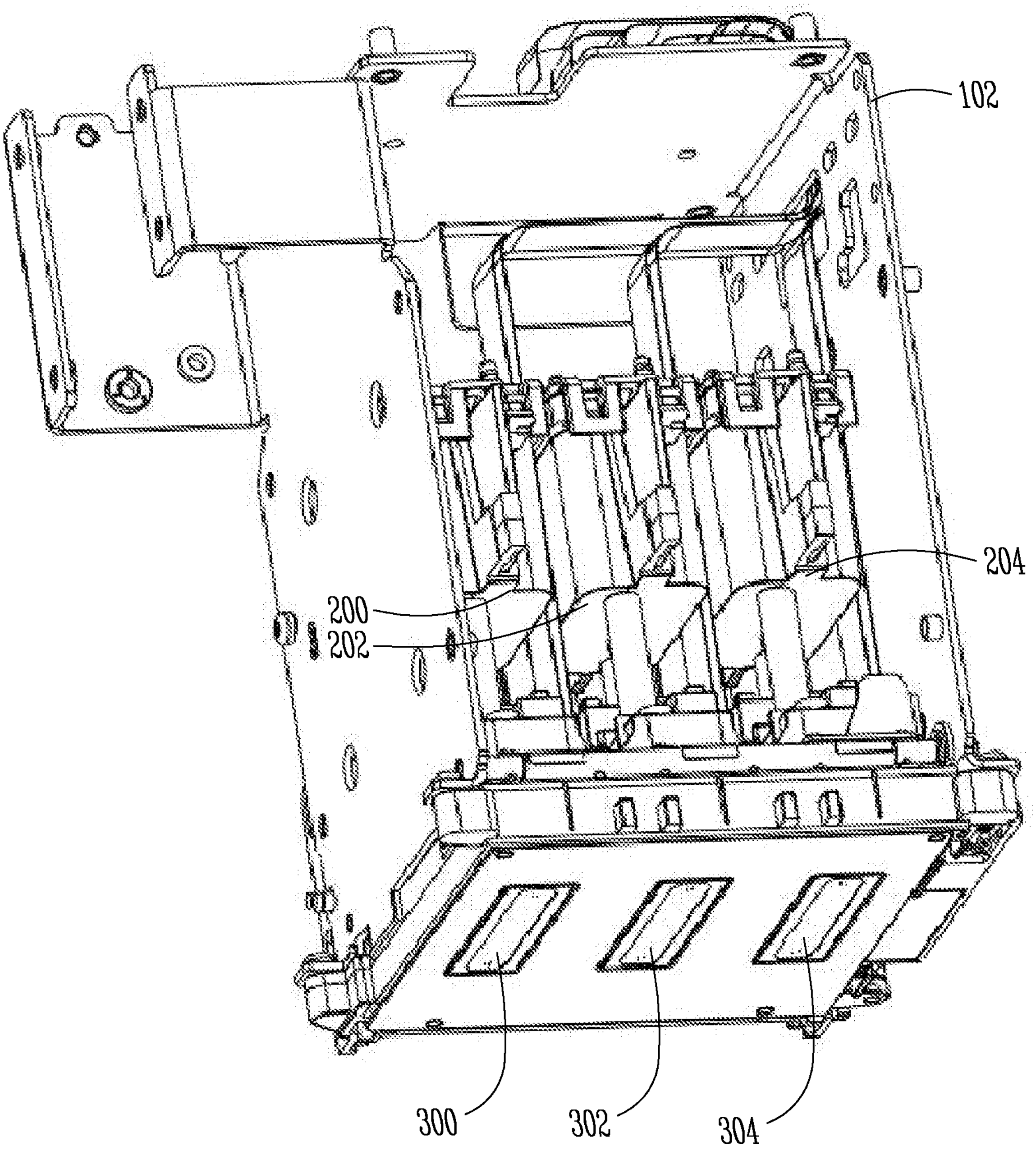
FIG. 3 illustrates an example of print heads connected to the header tanks.

FIG. 3 illustrates an example of print heads connected to header tanks, such as header tanks 200, 202, 204. The header tanks may be operatively connected to print heads. In an example, a single header tank may be connected to a corresponding one of the print heads, and feed ink from the chamber or chambers of the header tank (in the example of a dual or multi chamber tank) to the print heads through nozzles located on a nozzle plate on the bottom of the print heads (as described below).

In an example illustrated in FIG. 3, print heads 300, 302, 304, may be located on a bottom/lower surface of the scan head 102, and connected to the header tanks 200, 202, 204. In an example, there may be as many print heads 300, 302, 304, as there are header tanks 200, 202, 204, with one of the header tanks 200, 202, 204, corresponding to (e.g., be connected to and feed/send/provide ink to) one of the print heads 300, 302, 304, which in turn may eject/spit/drop ink through one or more print nozzles (shown and described in FIG. 4 below). For example, header tank 200 may correspond to print head 300, while header tank 202 may correspond to print head 302, and header tank 204 may correspond to print head 304. Alternatively, the system may include multiple single-channel header tanks, one or more of which may be operatively connected to one or more print heads (e.g., six header tanks connected to some combination of three or more print heads).

Figure 4:
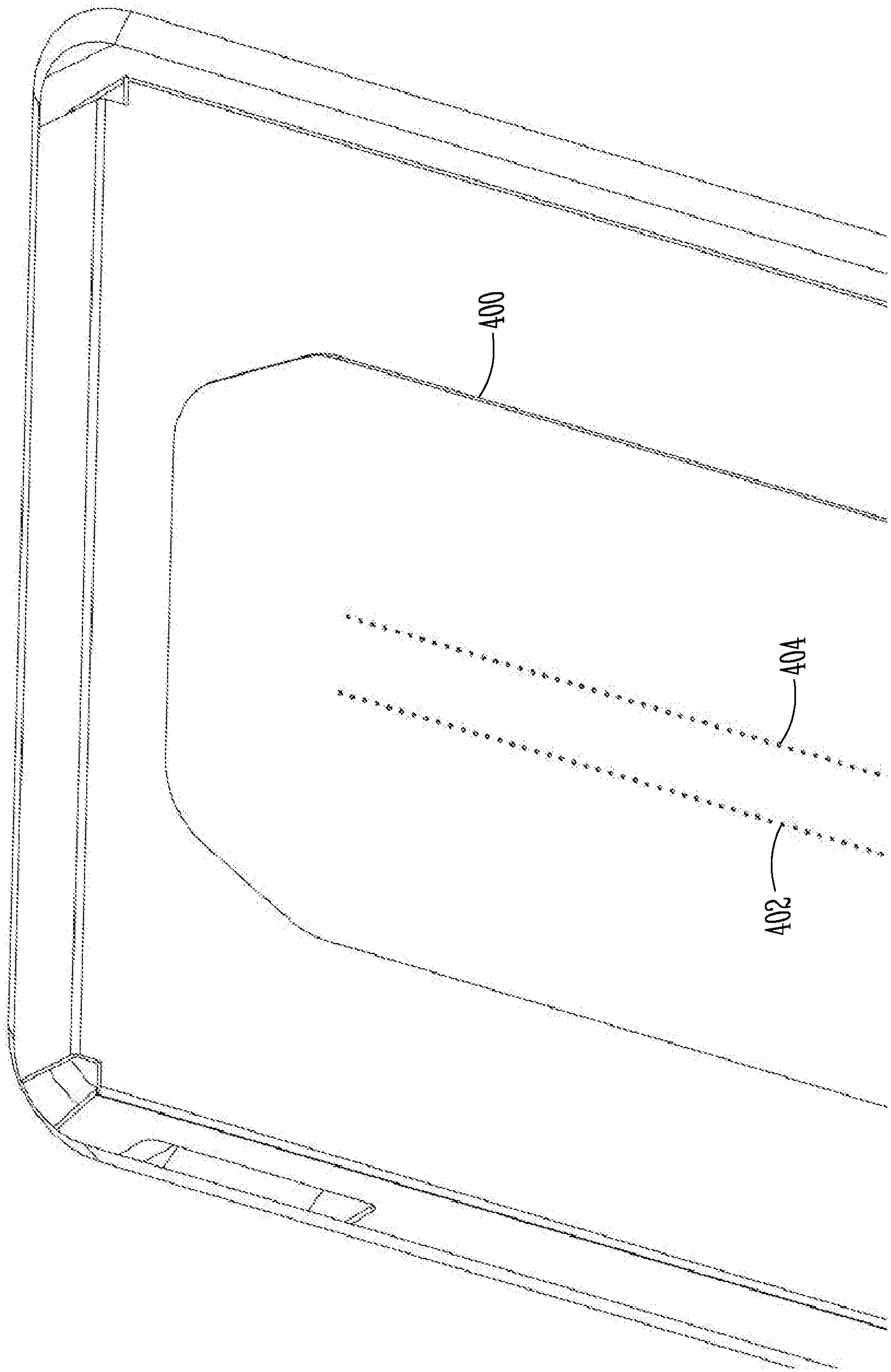
FIG. 4 illustrates an example of the nozzle plate of the print heads including a plurality of print nozzles.

FIG. 4 illustrates an example of a partial nozzle plate 400 of a print head, such as print heads 300, 302, or 304 including a plurality of print nozzles. The system may include multiple nozzle plates (e.g., one or more nozzle plates per print head). The nozzle plates of the print heads may contain one or more rows of nozzles through which ink from the chambers of the header tanks, such as header tanks 200, 202, or 204 is ejected, dropped, or the like, into the interior 100 such as onto card surface 108. In an example as described above in which multiple single-channel header tanks are connected to some combination of print heads, multiple header tanks (e.g., two header tanks) may be operatively connected to a single print head such that ink from one header tank is ejected from a particular first row of nozzles on the nozzle plate, and ink from another header tank is ejected from the other of the row of nozzles (e.g., a second row of nozzles) on the nozzle plate. Alternatively, a single header tank may be connected such that ink from that tank is only ejected from particular nozzles in a row of nozzles on the nozzle plate. The present disclosure is not to be limited by any particular configuration or connection between the header tanks, print heads, and nozzles.

In the specific example of FIG. 4, each print head 300, 302, or 304 may include a nozzle plate, such as nozzle plate 400 which may be formed from a piezoelectric or another similar material. The nozzle plate 400 may, in turn, include a first row of print nozzles 402 and a second row of print nozzles 404, each row including a plurality of individual nozzles. Each individual nozzle in the rows of nozzles 402 and 404 is configured to eject, drop, spit, or the like, ink from a particular one of the header tanks, such as header tanks 200, 202, or 204 connected to a particular one of the print heads, such as print heads 300, 302, or 304.

Figure 5:
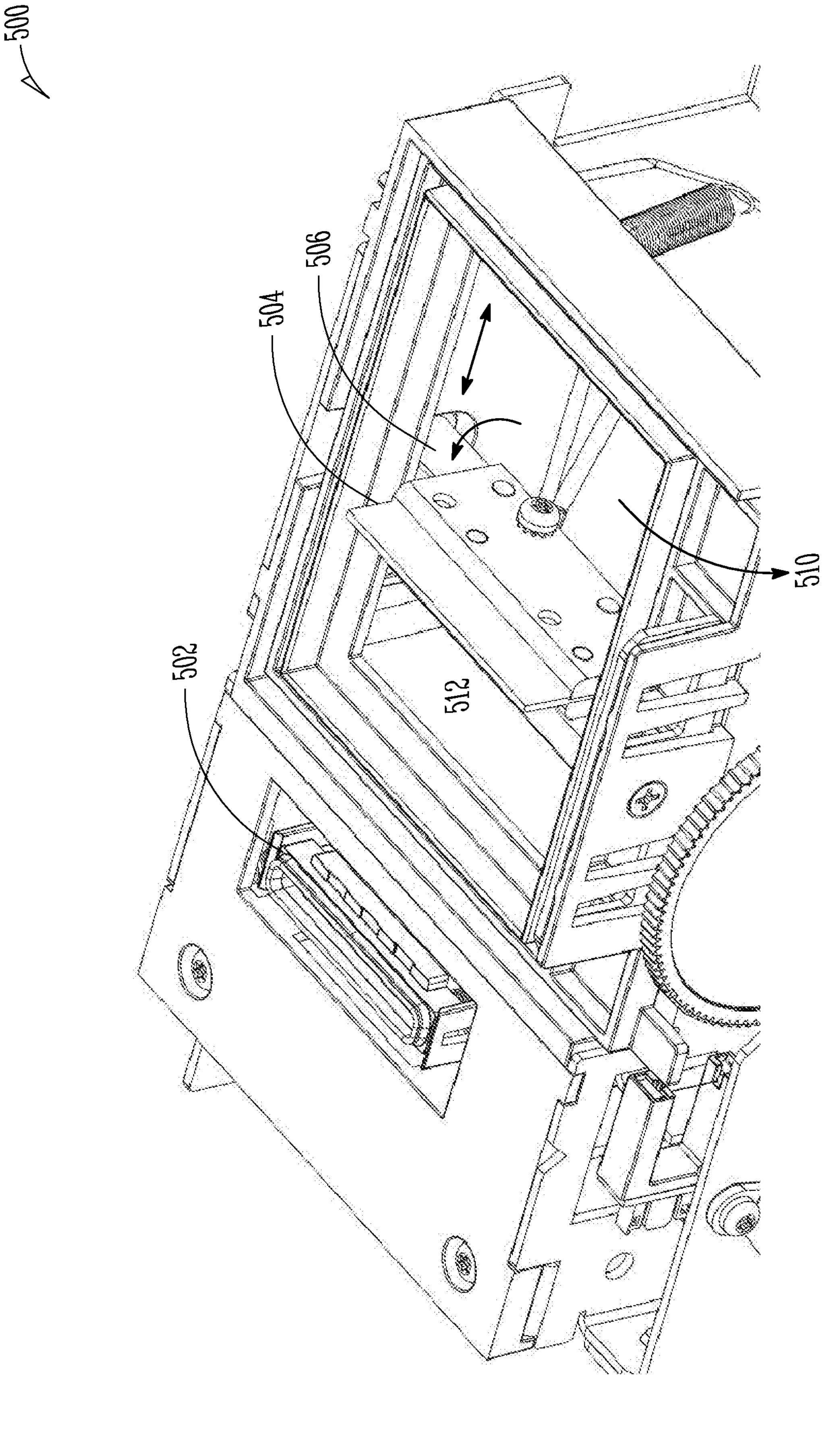
FIG. 5 illustrates an example of a maintenance station including a purge cap and wiper.

FIG. 5 illustrates an example of a maintenance station 500 including a purge cap 502 and wiper 504. The maintenance station may be located below the scan head 102, and may be used to clean the print heads and/or the nozzle plate utilizing a vacuum pump and/or a wiper to remove clogs or other similar obstructions in the nozzles, or to wipe, remove, or the like, ink from the print heads. For example, the system may employ a "spitting while wiping" process (described in detail below) to clean the print heads 300, 302, 304, and the nozzle plate 400 corresponding to the particular print head 300, 302, or 304.

In the example illustrated in FIG. 5, the maintenance station 500 may be located or included in/within the interior 100 of the printer, such as below the scan head 102. In an example, the maintenance station may be fixed, stationary, or the like, below the scan head 102. In an example, the scan head 102 may be movable to the maintenance station 500 (e.g., by moving/lowering the scan head downward). Moving the scan head to the maintenance station may place one or more of the print heads, or the nozzle plates of the print heads, in a position so as to be cleaned (e.g., one or more nozzles to be cleared of a clog or other similar obstruction). Additionally, or alternatively, the maintenance station may be configured to move to the scan head 102 (e.g., upward), to place the maintenance station into a position to clean the print heads, nozzle plate, or nozzles, as described above.

The Spitting while Wiping Process

In an example, an amount of ink may be ejected from a print head, such as print head 300, 302, or 304, (e.g., from one or more of the nozzles in the row of nozzles 402 or 404), e.g., onto the nozzle plate 400. A wiper 504 is located on, near, or within the maintenance station 500 and may be configured to move (e.g., laterally, left-to-right, right-to-left, side-to-side, or the like) below the print heads 300, 302, 304 and each of the print heads' corresponding nozzle plate, such as nozzle plate 400. Additionally, or alternatively, the wiper 504 may rotate about/around an axle 506. The wiper 504 may be formed from a flexible material such as rubber or another similar material. The wiper 504 may be formed in the shape of a blade with at least an edge configured to contact the surface of the nozzle plate 400 and wipe against the nozzle plate as the wiper is moved laterally and/or is rotated, as described above. The wiper 504 may, simultaneously or substantially simultaneously with the ejection of the ink from at least one nozzle in the row of nozzles 402, 404 onto the nozzle plate 400, wipe the nozzle plate 400 clean of ink.

By simultaneously or substantially simultaneously wiping the ink from the nozzle plate 400 with the wiper 504 as the ink is ejected from at least one nozzle in the rows of nozzles 402, 404, ejected ink may be prevented from being pushed back into the nozzles and mixing with "clean" ink, or being re-ejected, re-dropped, re-spit, or the like from, the print heads 300, 302, or 304 during a subsequent print operation or print job. In an example, the wiper 504 may rotate about the axle 506 which may be a cylindrical rod connected, attached, or the like, to the wiper 504 which allows the wiper 504 to additionally wipe against a piece of material 512 (e.g., plastic, metal, or the like) allowing ink to be cleared from the wiper 504. Waste ink wiped from the nozzles, nozzle plate, or print heads may collect on the surface of the wiper 504, as the wiper moves below the print heads/nozzles/nozzle plates, and when the wiper 504 is rotated about the axle 506, the waste ink may be removed (e.g., scraped off) from the wiper as it makes contact with the material 512. Then, as (e.g., immediately after or at substantially the same time as) the waste ink is removed from the wiper 504 it may fall or otherwise caused to be moved below the wiper 504 and axle 506, into a waste deposit 510, which may be a well, depression, opening, compartment, or the like, at which point, the waste ink may be removed from the maintenance station 500, such as by being sucked/vacuumed, or the like, from the maintenance station 500 using a vacuum pump, such as 600 as shown and described in FIG. 6, below.

The Reverse Purge Process

Figure 6:
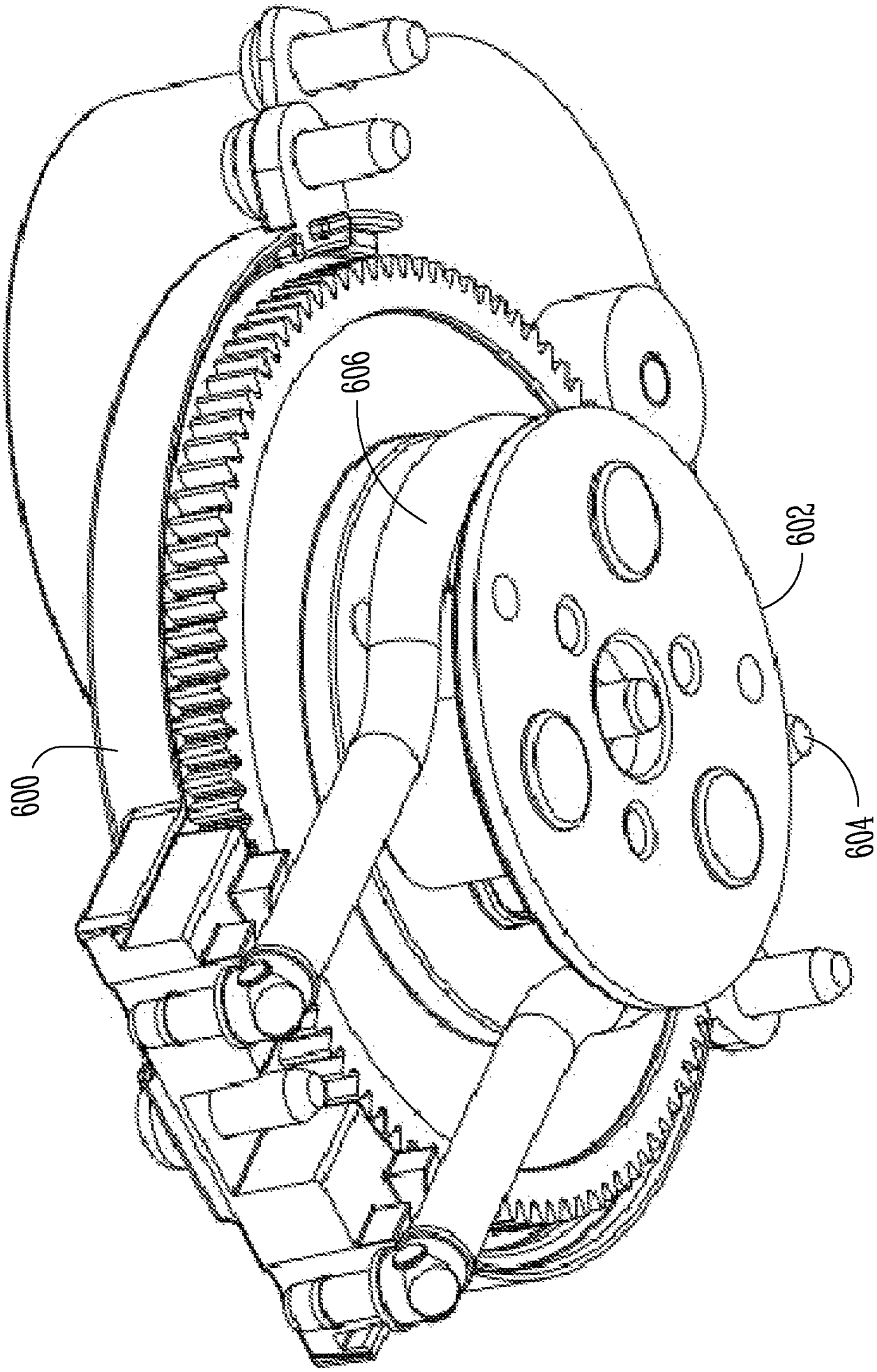
FIG. 6 illustrates an example of a vacuum pump employed by the system.

Returning to FIG. 5, the maintenance station 500 may also include a purge cap 502 which may be used as a part of a reverse purging process in conjunction with a vacuum pump such as pump 600 shown in FIG. 6. The purge cap 502 may be located below the print heads as the print heads/scan head moves to the maintenance station 500 as described above. In some examples, the purge cap 502, may additionally or alternatively move to the scan head 102 (e.g., move with the maintenance station to the scan head), so as to locate the purge cap 502 below one or more nozzles in one of the row of nozzles 402, 404, on the nozzle plate 400. The nozzles 402, 404, or the nozzle plate 400, may be operably positioned over the purge cap 502 such that at least a partial seal may be made around one or more nozzle, an entire row of nozzles, such as 402, 404, or an entire print head, such as 300, 302, or 304.

Once the purge cap 502 is in place below the nozzles/nozzle plate/print head, the vacuum pump 600 may be reversed so as to apply a positive pressure through the purge cap 502 causing ink, a clog, or an obstruction in one or more nozzles of the rows of nozzles 402, 404 to be pushed into the nozzle (e.g., in a direction toward the header tanks 200, 202, 204), in a "reverse purge" process. Optionally, the vacuum pump may be reversed again to suck the clog or obstruction out of the nozzle, or a technique such as the "spitting while wiping" technique described above, may be employed additionally or alternatively to clean, clear, or the like, the rows of nozzles 402, 404 after the reverse purge process is performed. In an example, the vacuum pump 600 may be used to perform the "reverse purge" process on the print head or nozzles, with any "normal purge" process (e.g., sucking/vacuuming a clog out of the nozzle) either before or after the reverse purge, being optional.

Example Pump

FIG. 6 illustrates an example of a vacuum pump 600 employed by the system. This may include, for example, one or more peristaltic pumps, or any other suitable pump capable of moving ink through a tube, such as tube 116, or a series of tubes (e.g., from the ink cartridges to the header tanks) or creating a positive pressure at the purge cap 502 to employ the reverse purging process, as described above. In an example, the vacuum pump 600 may include a rotor 602 which may include one or more lobes 604 capable of compressing a tube 606 as the rotor 602 rotates, turns, or the like. The lobes 604 may include or be replaced by one or more rollers, shoes, wipers, or the like. As the rotor 602 turns, the part of the tube 606 under compression is occluded (e.g., pinched closed), forcing a fluid to be moved through the tube 606.

In an example the system may utilize, employ, include, or the like, one or more vacuum pumps 600 attached to various components such as the ink cartridge 112, the scan head 102, the maintenance station 500, or any similar component. The pump 600 may be configured to move ink through tubing, hoses, or the like, connected to various components, or may be configured to remove (e.g., through suction) waste ink from the maintenance station 500.

Auto Agitation Routine

Figure 7:
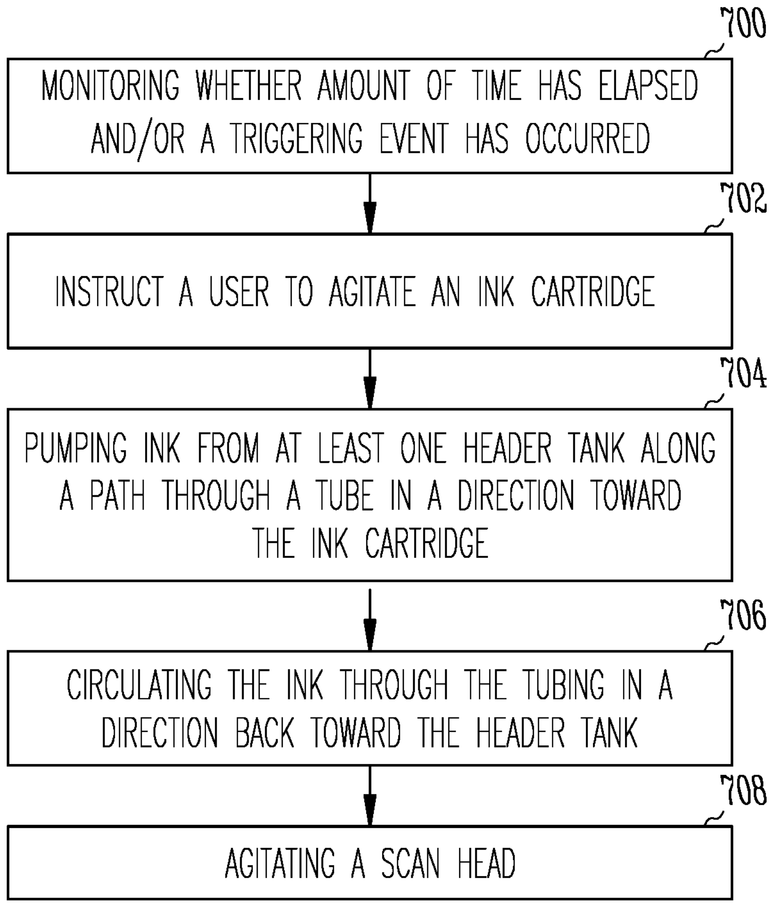
FIG. 7 illustrates an example of a method for ink jet nozzle health and printing reliability.

FIG. 7 illustrates an example of a method for improving ink jet nozzle health and printing reliability, and particularly a method for automatically agitating the ink between the ink cartridges and the header tanks, also referred to herein as "auto agitation." Step 700 may include monitoring an elapsed time period or other triggering event. The elapsed time period may be the amount of time since a prior auto agitation routine has been run. In an example, the elapsed time period may be the period of time since a ink cartridge such as 112 has been automatically or manually agitated, shaken, or the like (e.g., the amount of time since a ink cartridge such as 112 has been removed from the print cartridge carriage 110 and shaken, vibrated, or the like, to cause the ink in the cartridge 112 to mix). This may be done by, for example, shaking the cartridge 112 by hand or using a mechanical stirrer. In an example, the elapsed time (e.g., eight hours or other suitable time) may be set by a user of the printer or may be, e.g., a default time period set by the manufacturer. For example, the manufacturer setting may recommend that an ink cartridge such as ink cartridge 112 be manually agitated or otherwise shaken every eight hours, but the user may set a lower amount of time (e.g., every six hours or other suitable time). In an example, the elapsed time may correspond to the amount of time the printer is idle, turned off, or in a low-power state (e.g., a sleep state). The period of time may be monitored by a processor included as a part of the printer or a processor external to the printer.

At optional Step 702, the user may be instructed to agitate the cartridge. This may include prompting the user to change the cartridge on a user interface (UI). In an example, the (UI) may be a graphical user interface (GUI) on the printer, or may be sent to a GUI of a mobile device or a similar GUI external to the printer (e.g., the monitor of a computer or other device to which the printer is operably connected). In an example, when the instruction message is sent to the UI, the printer may enter a locked mode, which may disable or otherwise prevent the printer from accepting or printing any new print jobs, or beginning, starting, or the like, any scheduled print jobs, until the cartridge 112 is removed from the carriage 110 and agitated.

Triggering Events

Step 704 may include pumping, moving, or the like, ink from at least one of the header tanks, such as header tanks 200, 202, or 204 along a path toward one or more ink cartridges such as 112 (e.g., through the tubing such as tube 116 connecting the ink cartridges to the header tanks). This may be done automatically after the time period of Step 702 has elapsed or other triggering event, such as a user manually starting the auto agitation routine by selecting an option on the UI discussed above, is detected. In an example, the elapsed period of time may be the amount of time since a portion of the ink contained in at least one of the header tanks was previously pumped from a header tank in a direction toward the ink cartridge(s) connected to that header tank. The ink may be pumped/moved from the header tanks toward the ink cartridges using one or more vacuum pumps, such as vacuum pump 600. In an example, only a portion of the ink from the header tanks may move/pump all the way to the ink cartridges (e.g., not all of the ink will move into the ink cartridges). A portion of the ink may remain in the tubing between the header tanks and the ink cartridges. In an example, the entire amount of ink in the header tanks may be pumped from the tank so as to drain/completely empty the tank. Alternatively, a portion of ink may remain in the header tanks during the auto agitation process.

In an example, the triggering event may be the user manually activating the auto agitation routine. In another example, the triggering event may be the detection, by one or more sensors, of a potential issue (e.g., a potential clog, obstruction, or the like) in one of the print heads, one of the print nozzles, or in one of the tubes. In another example, the triggering event may be the replacement of one of the ink cartridges.

Step 706 may include circulating (e.g., pumping with a vacuum pump such as 600) ink through the tubing such as tube 116, in a direction from the ink cartridges back to the header tanks, such as header tanks 200, 202, or 204. In an example, steps 704 and 706 may be performed to move ink from a single header tank toward a single ink cartridge (e.g., a cartridge containing white ink) connected to the header tank, and back into the header tank. In another example, ink may be moved from multiple header tanks toward multiple ink cartridges, and back to the header tanks as desired or needed. In an example, the header tanks may contain/include a level sensor configured to monitor the amount of ink in the header tanks, to prevent the header tank from overfilling with ink as it is pumped/circulated back from the direction of the ink cartridges.

Step 708 may include agitating the scan head 102. This may include moving the scan head 102 along the x-direction gantry 104, the y-direction gantry 106, or a combination thereof to mix the ink in the header tanks 200, 202, or 204. In an example, the scan head may move more rapidly, faster, or the like, during step 708 than when printing an image in order to cause the scan head to shake, vibrate, or the like, and mix the ink. In an example, the scan head may move at the same speed, or at a slower speed during the agitation of Step 708 than when printing an image, as needed. Step 708 may be performed before, after, during, or independently of Steps 704 or 706. Likewise, in some examples, Step 708 may be performed independently of all other steps (e.g., on its own).

In an example, any one or more of Steps 700-708 may also be used as a startup/agitation process for the printer, such as when the printer is powered on or "awakened" from a sleep or low-power mode/state. Further, any one or more of Steps 700-708 may be performed multiple times (e.g., repeated more than once, run through two or more cycles, or the like) to mix the ink. For example, Steps 704 and 706 may be repeated any suitable number of times as desired or necessary. In an example, the system may automatically repeat one or more of Steps 700-708, or, alternatively, a user may repeat any one or more of the steps as desired.

Step 710 may include applying a "tickle pulse" to one or more print heads, such as 300, 302, or 304. In an example of 710, the processor may cause a waveform (e.g., a current or voltage) to be applied to each of the one or more print heads that is not strong enough to eject a drop from any of the print nozzles on the print heads, but cause ink to move from the corresponding header tanks 200, 202 or 204 to the corresponding print heads where the ink can move, slosh, or the like, within the print heads. Applying the tickle pulse may cause the ink to mix, be stirred, or the like, within/inside the print heads. Step 710 may be performed at the same time as any one or more of Steps 700-708 or may be performed separately as the user or system desires or deems necessary.

Reverse Purge Method

Figure 8:
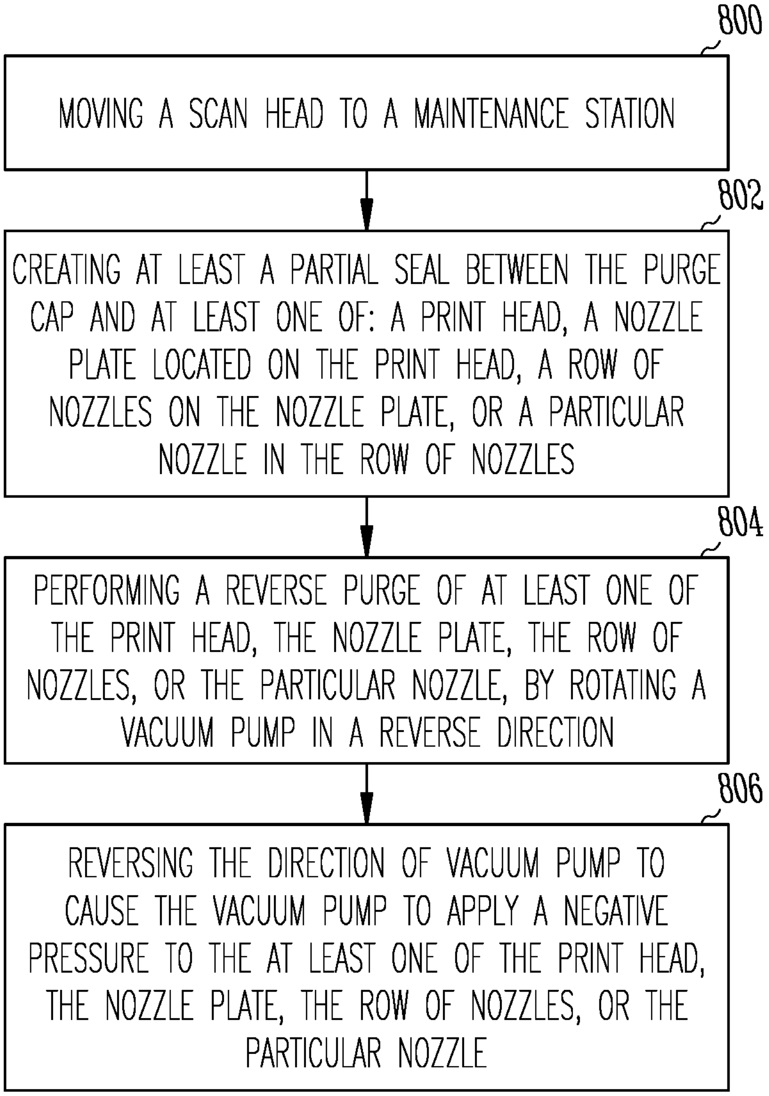
FIG. 8 illustrates an example of a method for ink jet nozzle health and printing reliability.

FIG. 8 illustrates another example of a method for improving ink jet nozzle health and printing reliability, and particularly a method for "reverse" purging the print heads, as introduced above. Step 800 may include moving a scan head, such as 102, to a maintenance station, such as 500, the maintenance station including a purge cap such as 502 and a wiper such as 504, each described above. The purge cap may be placed, located, moved, or the like, below a print head. In an example, the print head may move to the location of the purge cap, such as by the print head being lowered to the maintenance station 500, as described above. Additionally, or alternatively, the maintenance station 500 may move to the location of the print head in order to locate the purge cap below the print head. The purge cap may be caused to be located above one or more of the nozzles on the nozzle plate of the print head, such as nozzle plate 400, or over an entire row of nozzles, such as 402 or 404, to create at least a partial seal between the purge cap and at least one of: a nozzle, a row of nozzles, the nozzle plate, or the print head, at Step 802.

Step 804 may include performing a reverse purge of at least one of: a print head, a nozzle plate located on the print head, the row of nozzles on the nozzle plate, or the particular nozzle in the row of nozzles, by operating the vacuum pump in a reverse direction. Step 804 may be accomplished by activating the vacuum pump such that the vacuum pump causes the purge cap to apply a positive pressure to the at least one of: the print head, the nozzle plate located on the print head, the row of nozzles on the nozzle plate, or the particular nozzle in the row of nozzles. This may aid in removing a clog or an obstruction in the print nozzle by pushing the clog/obstruction up through the nozzle. Further, Step 804 may additionally or alternatively be used, even when there is no clog in a nozzle, in order to mix, circulate, agitate, or the like, the ink in a particular nozzle with the ink in a particular header tank (e.g., push ink from a nozzle into the header tank) connected to the particular nozzle.

Step 806 may include operating the vacuum pump in a forward direction (e.g., reversing the direction of the vacuum pump compared to the direction of the operation of the vacuum pump in Step 804) so as to apply a negative pressure at the purge cap to allow the ink or a clog/obstruction to be sucked/vacuumed out of the print head, a print nozzle, or from the nozzle plate. Step 806 may be optional and can be performed before, after, or independently of Step 802, as needed or desired.

Spitting while Wiping Method

Figure 9:
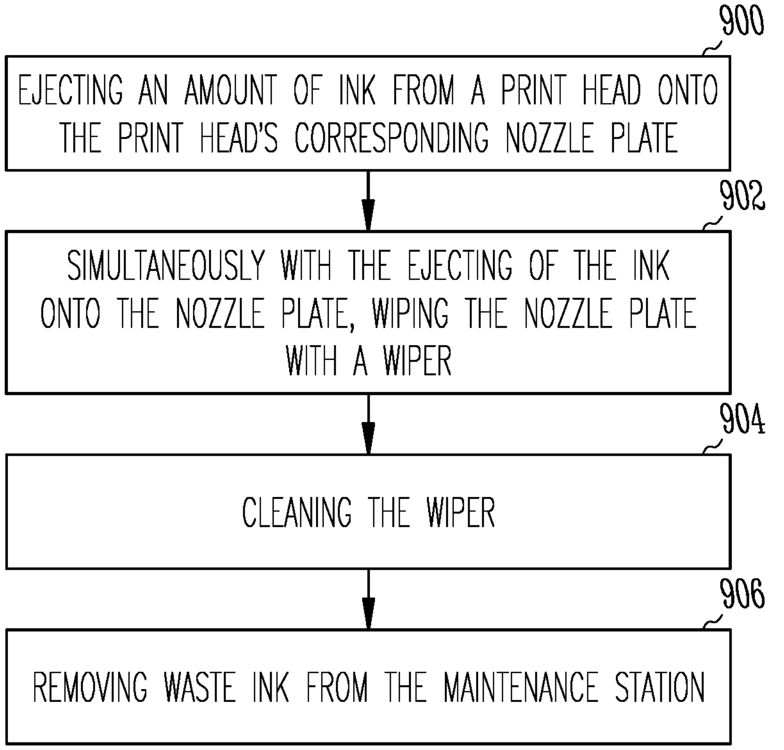
FIG. 9 illustrates an example of a method for ink jet nozzle health and printing reliability.

FIG. 9 illustrates another example of a method for improving ink jet nozzle health and printing reliability, and particularly a method for spitting while wiping, as introduced above. Step 900 may include ejecting an amount of ink from a print head such as 300, 302, or 304 onto the corresponding nozzle plate such as 400 of the print head. In Step 900, the ink may not be ejected at a full/normal force, amount of pressure, speed, or the like, from the nozzles/print head as when printing an image, but may be at the force of, for example, a "tickle" pulse or at any other suitable force between the force used for a "tickle" pulse and that used for printing an image to a substrate.

Step 902 may include, simultaneously or substantially simultaneously with the ejecting of the ink onto the nozzle plate in Step 900, wiping the nozzle plate with a wiper, such as 504, which may move below the print head/nozzle plate. By ejecting the ink more slowly/with less pressure in Step 900 than when printing an image or an otherwise “normal” print job or print operation may allow the wiping of Step 902 to occur at substantially the same time as one another.

Step 904 may include cleaning the wiper. This may include rotating, turning, or the like, the wiper about an axle, such as 506 which may be a cylindrical rod connected, attached, or the like, to the wiper which allows the wiper to wipe against a piece of material, such as 512 (e.g., plastic, metal, or the like), which, in turn, may allow waste ink to be cleared from the wiper 504. As the waste ink is removed from the wiper (e.g., immediately after or at substantially the same time as the wiper 504 wipes against the material 512), it may fall or otherwise be caused to collect below the wiper and axle into a waste deposit such as 510, which may be a well, depression, opening, compartment, or the like, located below the wiper 504 and axle 506.

Step 906 may include removing the waste ink from the maintenance station, such as by sucking, vacuuming, or the like, from the maintenance station waste deposit using a vacuum pump such as 600. Step 906 may be performed at the same time (e.g., immediately after, or a short amount of time, such as within a minute after) as Step 904, or may be performed on a periodic basis or as necessary (as determined by the processor) or desired by the user. This “spitting while wiping” process may allow the nozzle plate to be cleared of ink without the ink being pushed back up into one of the print nozzles where it may mix with, and potentially contaminate “clean” ink being ejected from the print head when printing a new image or print job or print operation. It is understood that any one of Steps 902 to 906, or a combination of Steps 902 to 906 may be repeated as necessary or desired by the user.

Randomized Nozzle Position

Figure 10:
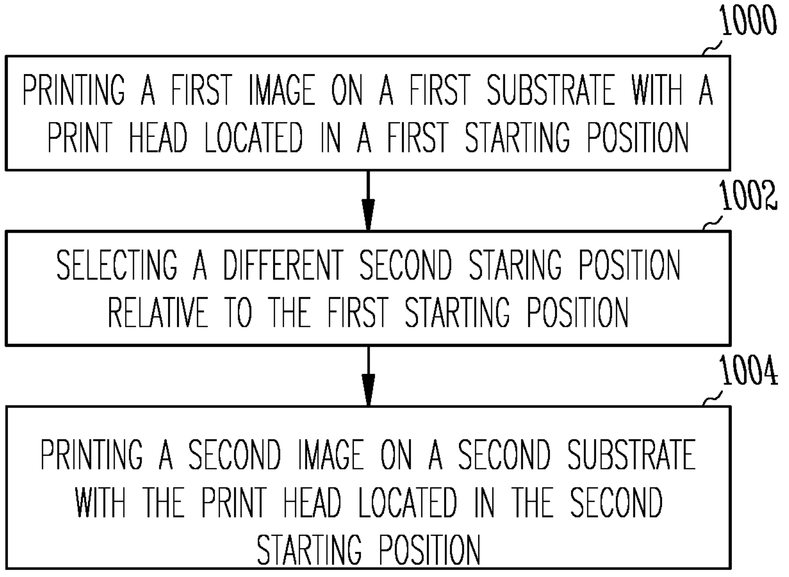
FIG. 10 illustrates an example of a method for ink jet nozzle health and printing reliability.

FIG. 10 illustrates another example of a method for improving ink jet nozzle health and printing reliability, and particularly a method for changing starting position of a print head. In a print job, when printing the same or substantially the same image multiple times in a row (e.g., over and over) to a plurality of similar substrates (each printing of the image to a substrate being a “print operation”), conventionally, the print heads will start in the same position for each print operation, move in the same pattern over the substrates, and end each print operation in the same position. Consequently, the same nozzles on the print head get used over and over again throughout the print job, while other nozzles are not used at all. Over time, this can degrade the print quality as the nozzles that are not used may become clogged or otherwise may not eject ink properly when it subsequently becomes time for their use, such as in a new or different print job.

To address this issue, in general, the initial starting position of a print head relative to a substrate for one or more print operations within a print job may be changed from or otherwise be different than the initial starting position of the print head relative to the substrate for other print operations within the print job. In this way, for one or more print operations, a different set of nozzles of the print head will be used to print the image on the substrate(s). As a result, the chance that only some nozzles will be used repeatedly for a given print job, or that some nozzles will go without use for extended periods of time, is reduced or even eliminated. The initial starting position of the print head for the one or more print operations where the initial starting position is altered or changed may be selected randomly, semi-randomly, or based on a predetermined algorithm.

More specifically, Step 1000 may include printing, in a first print operation of a print job, a first image on a first substrate with the print head, such as print heads 300, 302, or 304, starting the print operation in a first starting position. Accordingly, when printing an image on the substrate, such as 108, the print head may employ one or more of the nozzles such as in the rows of nozzles 402, 404 to print the first image, while other nozzles in the row of nozzles 402, 404 may not be needed or otherwise used to print the first image.

Step 1002 may include selecting a second starting position for the print head relative to the substrate(s). The second starting position may be selected randomly, semi-randomly, or based on a predetermined algorithm. The second starting position for the print head is different than the first starting position for the print head, relative to the substrates. In an example, the first starting position and/or the second starting position may be chosen, selected, or the like, by the processor of the printer, or a processor connected to the printer. In an example, the first starting position and/or the second starting position may be selected, chosen, or the like, by a user of the printer.

Step 1004 may include printing, in a second print operation of a print job, a second image on a second substrate with the print head starting the print operation in the second starting position. As such, the print operation for printing the second image on the second substrate starts at a different portion of the surface of the substrate as compared to where the print operation for printing the first image on the first substrate was started. For example, the first starting position of the print head may be located such that the first image starts printing in the middle of the first substrate. In a subsequent print operation, the second starting position of the print head may be located such that the second image starts printing in a corner of the second substrate. Such variation of the starting position, e.g., in Step 1002, may allow one or more of the print nozzles used/utilized in Step 1004 to be a different than one or more of the print nozzles used/utilized in Step 1000. Steps 1002 and 1004 may be repeated for any print operation of a print job, any subset of print operations of a print job, or for all or nearly all print operations in a print job. In some examples, the starting position of the print head for even the first print operation of a print job may be selected randomly, semi-randomly, or based on a predetermined algorithm. In some examples, which print operation or print operations within a print job for which Steps 1002 and 1004 are performed may also be selected randomly, semi-randomly, or based on a predetermined algorithm. In still other examples, a first starting position may be used for one or more (e.g., a first subset) print operations within a print job, and a second starting position may be used for one or more (e.g., a second subset) of other print operations within the print job. Of course, any number of starting positions may be selected and corresponding associated with one or more (e.g., third, fourth, etc., subsets) print operations within the print job as well. In an example, the starting position of the print head for each print operation of a print job (optionally excluding the first print operation) may be selected pursuant to Step 1002.

In an example, at least a portion or part of the first image may be the same as or identical to at least a portion or part of the second image. In a further example, the first image is the same as or identical to the second image, for example, when printing multiple identification cards, credit cards, or the like, which may have identical logos, markings, numbers, or the like on at least a portion of the card. By randomizing the starting location of the print head for print operations within a print job, and therefore, which print nozzles will print the image on the first card versus which nozzles will print the same image on a second card, it may prevent the nozzles on the print head from remaining idle (e.g., not ejecting ink) for an extended period of time. This may reduce or prevent the tendency of nozzles to have poor jetting of the ink and/or degrading, reducing, lowering, or the like, of the print quality.

It is understood that any of the methods described herein may be performed in conjunction with one another or independently. Further, some of the steps in any method may be repeated or omitted as necessary or desired.

Figure 11:
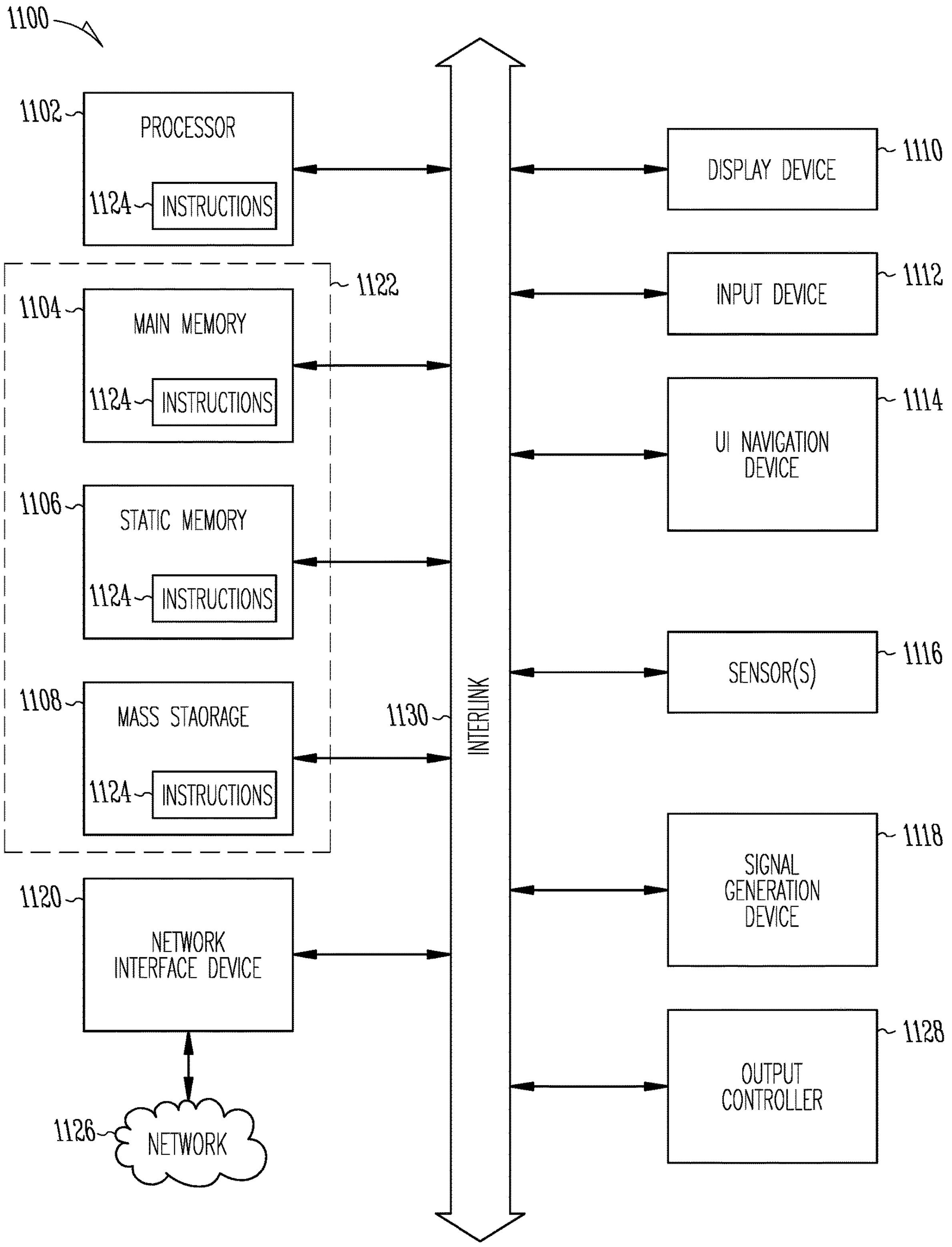
FIG. 11 illustrates an example of a block diagram of a machine upon which any one or more of the techniques discussed herein may perform.

FIG. 11 illustrates generally an example of a block diagram of a machine 1100 upon which any one or more of the techniques (e.g., methodologies) discussed herein may perform in accordance with some embodiments. In alternative embodiments, the machine 1100 may operate as a standalone device or may be connected (e.g., networked) to other machines. For example, the machine 1100 may be a printer in which the system described above is included, or a part or component of the printer, a component operably connected to the printer, or the like. The machine 1100 may also be a personal computer (PC), a tablet PC, a control system, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution's units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1130. The machine 1100 may further include a display unit 1110, an alphanumeric input device 1112 and a user interface (UI) navigation device 1114. In an example, the display unit 1110, alphanumeric input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, accelerometer, or another sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, a card reader, etc.).

The storage device 1108 may include a machine readable medium 1122 that is non-transitory on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1108 may constitute machine readable media.

While the machine readable medium 1122 is illustrated as a single medium, the term "machine readable medium" may include a single medium or multiple media (e.g., a centralized or distributed database, or associated caches and servers) configured to store the one or more instructions 1124.

The term "machine readable medium" may include any non-transitory medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for improving ink jet nozzle health and printing reliability of an ink jet printer, comprising:

monitoring whether a triggering event has occurred, wherein the triggering event is an elapsed period of time;

pumping, in response to detecting the triggering event has occurred, at least a portion of ink contained in a header tank from the header tank in a direction toward an ink cartridge through a tube connecting the header tank and the ink cartridge, wherein the header tank is included in a scan head and is connected to a print head, and wherein at least part of the tube is located proximate to a linking mechanism located along at least one of a side or rear of an interior portion of the ink jet printer, and wherein the linking mechanism is configured to move with or accommodate movement of the scan head; and after pumping the at least the portion of ink contained in the header tank from the header tank in a direction toward the ink cartridge, pumping at least another portion of ink from the ink cartridge through the tube in a direction toward the header tank.

2. The method of claim 1, further comprising:

agitating the scan head, wherein agitating the scan head includes causing the scan head to move in at least one of:

a left-to-right direction, a right-to-left direction, a back-to-front direction, or front-to-back direction along an x-y gantry.

3. The method of claim 1, further comprising:

using a level sensor included in the header tank to monitor a level of ink in the header tank.

4. The method of claim 1, wherein the elapsed period of time is an amount of time since the scan head has been agitated.

5. The method of claim 1, wherein the elapsed period of time is at least one of: an amount of time the printer has been powered off, an amount of time the printer has remained idle, or an amount of time the printer has been in a low-power mode.

6. The method of claim 1, wherein the elapsed period of time is an amount of time since the ink cartridge has been manually agitated.

7. The method of claim 1, wherein the elapsed period of time is an amount of time since a portion of the ink contained in the header tank was previously pumped from the header tank in a direction toward the ink cartridge.

8. A method for improving ink jet nozzle health and printing reliability of an ink jet printer, comprising:

monitoring whether a triggering event has occurred, wherein the triggering event is a manual activation of an auto agitation routine by selecting an option to agitate an ink cartridge on a user interface operably connected to the ink jet printer;

pumping, in response to detecting the triggering event has occurred, at least a portion of ink contained in a header tank from the header tank in a direction toward the ink cartridge through a tube connecting the header tank and the ink cartridge, wherein the header tank is included in a scan head and is connected to a print head, and wherein at least part of the tube is located proximate to a linking mechanism configured to move with or accommodate movement of the scan head; and circulating the ink pumped from the header tank back through the tube in a direction toward the header tank.

9. The method of claim 1, wherein the printer enters a locked state in response to detecting the triggering event has occurred, and wherein the locked state prevents the printer from printing a new print job.

10. The method of claim 1, wherein the linking mechanism comprises a flexible or semi-flexible chain.

11. The method of claim 2, wherein the scan head moves faster during the agitating than while printing an image to cause the scan head to shake or vibrate.

12. The method of claim 2, wherein agitating the scan head occurs in response to the printer being powered on.

13. The method of claim 2, wherein agitating the scan head occurs in response to the printer being awakened from a sleep state or low-power state.

14. A method for improving ink jet nozzle health and printing reliability of an ink jet printer, comprising:

monitoring whether a triggering event has occurred;

in response to detecting the triggering event has occurred:

pumping at least a first portion of ink contained in a header tank from the header tank in a direction toward an ink cartridge through a tube connecting the header tank and the ink cartridge, wherein the header tank is included in a scan head and is connected to a print head, and wherein at least part of the tube is located proximate to a linking mechanism configured to move with or accommodate movement of the scan head;

circulating the ink pumped from the header tank back through the tube in a direction toward the header tank;

pumping, for a second time, at least a second portion of ink contained in the header tank from the header tank in the direction toward the ink cartridge through the tube; and circulating the ink pumped at the second time back through the tube in a direction toward the header tank.

15. The method of claim 1, wherein the triggering event is a replacement of the ink cartridge.

16. The method of claim 1, wherein the triggering event is a detection, by a sensor, of an obstruction in at least one of: the print head, a print nozzle on the print head, or the tube.

17. The method of claim 1, further comprising:

pumping, for a second time, at least a second portion of ink contained in the header tank from the header tank in the direction toward the ink cartridge through the tube; and circulating the ink pumped at the second time back through the tube in a direction toward the header tank.

18. The method of claim 8, further comprising:

pumping, for a second time, at least a second portion of ink contained in the header tank from the header tank in the direction toward the ink cartridge through the tube; and circulating the ink pumped at the second time back through the tube in a direction toward the header tank.

19. The method of claim 14, further comprising:

applying at least one of a current or a voltage to the print head to cause ink to move from the header tank to the print head, wherein the at least one of current or voltage is not strong enough to eject ink from the print head.

* * * * *